United States Patent [19]

Kobayashi

[11] Patent Number: 5,168,434
[45] Date of Patent: Dec. 1, 1992

[54] FUSE-INCORPORATED, CHIP-TYPE SOLID ELECTROLYTIC CAPACITOR

[75] Inventor: Atsushi Kobayashi, Tokyo, Japan

[73] Assignee: NEC Corporation, Tokyo, Japan

[21] Appl. No.: 830,626

[22] Filed: Feb. 3, 1992

[30] Foreign Application Priority Data

Feb. 8, 1991 [JP] Japan .................................. 3-17919

[51] Int. Cl.$^5$ .......................... H01G 7/00; H01G 9/00
[52] U.S. Cl. ..................................... 361/534; 29/25.03
[58] Field of Search ...................... 361/534, 539, 540; 29/25.03

[56] References Cited

U.S. PATENT DOCUMENTS

| | | | |
|---|---|---|---|
| 3,828,227 | 8/1974 | Millard et al. | 361/540 |
| 3,855,505 | 12/1974 | Karlik et al. | 361/540 |
| 4,288,842 | 9/1981 | Voyles | 361/540 |

Primary Examiner—Donald A. Griffin
Attorney, Agent, or Firm—Laff, Whitesel, Conte & Saret

[57] ABSTRACT

A fuse-incorporated, chip-type solid electrolytic capacitor comprises an element which is composed of an anode body and a dielectric oxide film, a semiconductor layer and a cathode layer sequentially formed on the body. The body is made of a valve metal and carries an anode lead implanted therein. The capacitor also has an insulating resin layer applied to the outer peripheral surface of the element, said outer peripheral surface including an anode-lead-implanted surface and another surface located on the side opposite to the implanted surface, an anode terminal formed on the resin layer applied on the implanted surface, a cathode terminal formed on the resin layer applied on the opposite surface, and a fuse electrically connecting the cathode layer and the cathode terminal. The capacitor can be fabricated by connecting one end of the fuse to a part of the cathode layer, applying the resin layer onto the entire outer peripheral surface of the element except for the anode lead and the connected fuse, forming the anode and cathode terminals on the resin layer, and finally, electrically connecting the opposite end of the fuse to the cathode terminal.

5 Claims, 2 Drawing Sheets

FUSE-INCORPORATED, CHIP-TYPE SOLID ELECTROLYTIC CAPACITOR

BACKGROUND OF THE INVENTION

1) Field of the Invention

This invention relates to a fuse-incorporated, chip-type solid electrolytic capacitor and also to a fabrication process thereof, and especially to a connection structure for an cathode-side fuse and to its fabrication process.

2) Description of the Related Art

As is shown in FIG. 2, a conventional chip-type solid electrolytic capacitor is fabricated by applying an insulating layer 26 on the entire outer peripheral surface of a capacitor element (which has been formed in a manner known per se in the art) except for a surface with an anode lead 22 implanted therein and another surface opposite to the anode-lead-implanted surface, and then forming an anode terminal and a cathode terminal on the anode-lead-implanted surface and the opposite surface, respectively. The anode terminal and cathode terminal are composed of conductor layers 27,28, plating layers 29,30 and solder layers 31,32. Such a technique is disclosed, for example, in Japanese Utility Model Publication No. 14673/1987.

The conventional chip-type solid electrolytic capacitor described above can be fabricated in smaller dimensions than previous chip-type solid electrolytic capacitors. It, however, does not have a fuse due to its reduced size. This has led to the potential risk that, if the capacitor should fail and form a short circuit, the capacitor may burn out and, as a consequence, may cause an associated circuit to burn out partly or entirely.

SUMMARY OF THE INVENTION

An object of this invention is to provide a fuse-incorporated, chip-type solid electrolytic capacitor which is small in size but incorporates a safety fuse.

In one aspect of this invention, there is thus provided a fuse-incorporated, chip-type solid electrolytic capacitor. The capacitor comprises:

an element composed of an anode body and a dielectric oxide film, a semiconductor layer and a cathode layer sequentially formed on the anode body, said anode body being made of a valve metal and carrying an anode lead implanted therein;

an insulating resin layer applied on an outer peripheral surface of the element, said outer peripheral surface including an anode-lead-implanted surface and another surface located on the side opposite the anode-lead-implanted surface;

an anode terminal formed on the insulating resin layer applied on the anode-lead-implanted surface;

a cathode terminal formed on the insulating resin layer applied on the surface located on the side opposite to the anode-lead-implanted surface; and a fuse electrically connecting the cathode layer and the cathode terminal.

In another aspect of this invention, there is also provided a process for the fabrication of a fuse-incorporated, chip-type solid electrolytic capacitor. The process comprises the following consecutive steps:

(a) forming a dielectric oxide film, a semiconductor oxide layer and a cathode layer sequentially on an anode body, said anode body being made of a valve metal and carrying an anode lead implanted therein;

(b) connecting one end of an elongated fuse to a part of the cathode layer;

(c) applying an insulating resin layer onto the entire outer peripheral surface of the element except for the anode lead and the connected fuse, said outer peripheral surface including an anode-lead-implanted surface and another surface located on the side opposite the anode-lead-implanted surface;;

(d) forming an anode terminal on the insulating resin layer applied on the anode-lead-implanted surface;

(e) forming a cathode terminal on the insulating resin layer applied on the surface located on the side opposite to the anode-lead-implanted surface; and (f) connecting the opposite end of the fuse, which has already been connected to the cathode layer, to the cathode terminal electrically.

According to the present invention, the cathode layer of the capacitor element and the cathode terminal formed on the insulating resin layer are connected to the fuse. If the capacitor element should fail and form a short circuit, the fuse is caused to melt off. The capacitor according to the present invention has, therefore, the advantages that it can prevent the element from burning out and can enhance the general safety of associated circuits.

DETAILED DESCRIPTION OF THE INVENTION AND PREFERRED EMBODIMENT

Figure 1:
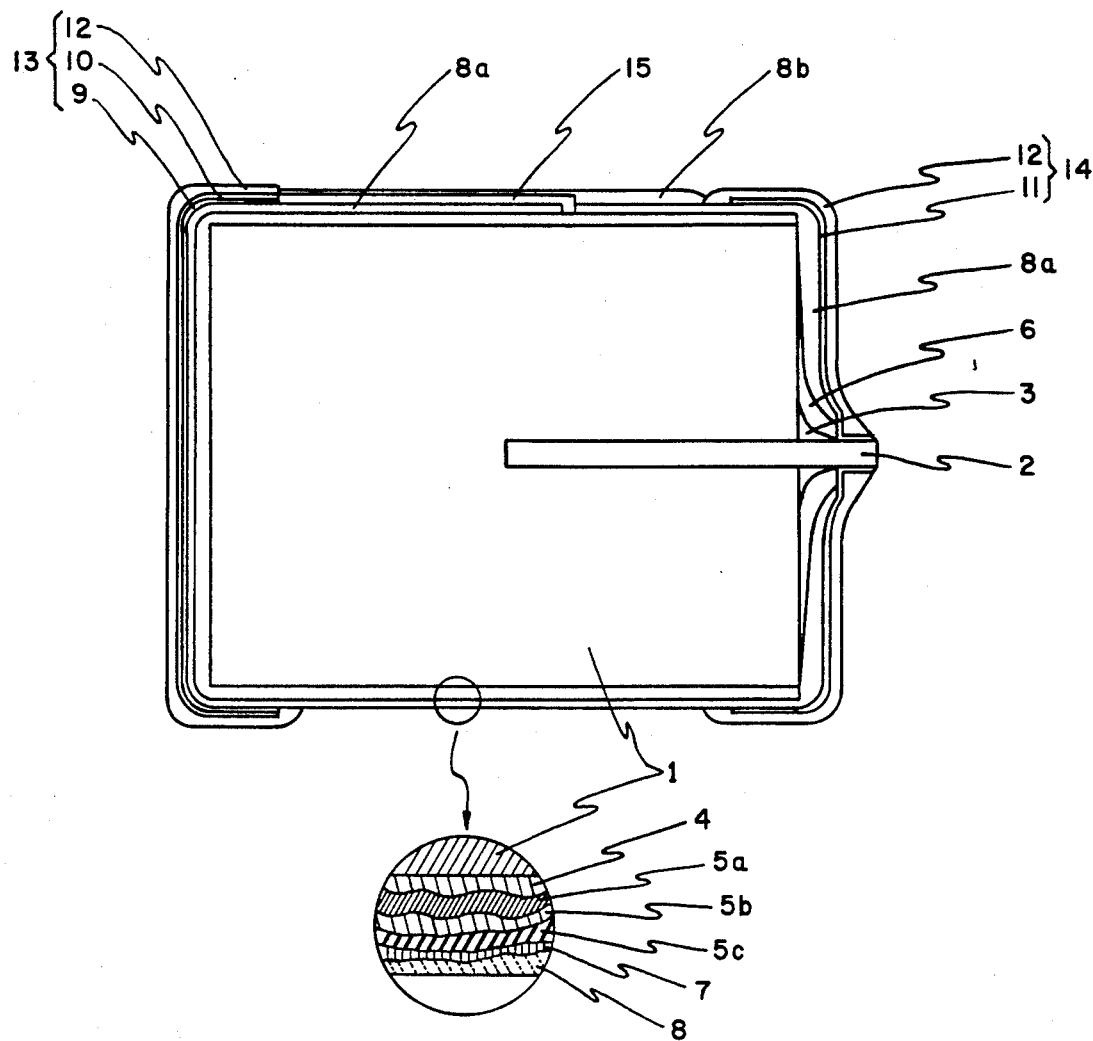
FIG. 1 is a cross-sectional view of a fuse-incorporated, chip-type solid electrolytic capacitor according to one embodiment of this invention, in which a part of the capacitor is shown in enlarged scale.

The present invention will next be described with reference to FIG. 1 of the accompanying drawings, in which hatching is omitted to avoid confusion except for the part shown in enlarged scale.

An anode body 1, which has been formed by press-forming and vacuum-sintering tantalum powder as one of the valve metals, carries an anode lead 2 made of tantalum and implanted therein. A water-repellant resin layer 3 is formed around the anode lead 2. On an outer peripheral surface of the anode body 1, an oxide film layer (not shown), a semiconductor oxide layer 4, a graphite layer (not shown), a first conductor layer 5a, and a second conductor layer 5b are formed one over another successively. A covering resin layer 6 is additionally formed around the anode lead 2. A third conductor layer 5c and a first plating layer 7 are formed one over the other on the outer peripheral surface of the anode body 1.

The first plating layer 7 is connected with a fuse 15. An insulating resin layer 8 is formed on the entire surface of the device except for the anode lead 2 and the fuse 15. Formed on a surface of the anode body 1, said surface being on the side opposite to the surface in which the anode lead 2 is implanted, are a fourth conductor layer 9 and a cathode terminal 13. The cathode terminal 13 is composed of a second plating layer 10 and a solder layer 12. Further, an anode terminal 14 composed of a third plating layer 11 and a solder layer 12 is formed on the insulating resin layer 8 applied on the anode-lead-implanted surface and also on the anode lead 2. The fuse 15 is connected with the cathode terminal 13.

A description will next be made of the fabrication process of this invention by taking, as an example, a fuse-incorporated, chip-type solid electrolytic tantalum capacitor of the construction described above (external dimensions: 5.7 mm long×5.0 mm wide×2.5 mm thick).

Tantalum powder with the anode lead 2 implanted therein, said anode lead 2 being also made of tantalum, is first press-formed and then sintered in a vacuum to form the anode body 1. A water-repellant resin is coated onto the anode body 1 around the anode lead 2 and is then heated and cured to form a water-repellant resin layer 3. The anode body 1 is next subjected to anodic oxidation at an anodization voltage of about 40 V in an aqueous phosphoric acid solution, whereby a dielectric oxide film layer composed of a tantalum oxide film is formed over the entire outer peripheral surface. Further, the anode body 1 is dipped in a solution of manganese nitrate and then heat-treated in an atmosphere of 200°-250° C. As a result, manganese nitrate is thermally decomposed and a semiconductor oxide layer 4 formed of manganese dioxide is formed (thickness: about 20–80 $\mu$m). These dipping and subsequent heating procedures are repeated a plurality of times so that the internal pores of the anode body 1 can be completely filled with manganese dioxide and a strong and uniform manganese dioxide layer can be formed on the outer peripheral surface of the anode body 1. The purpose of the formation of the water-repellant resin layer 3 is to prevent the manganese nitrate solution from contacting the anode lead 2 in this step.

The anode body 1 is next dipped in an aqueous solution in which a water-soluble resin and graphite powder are contained in combination. The anode body is then dried in an atmosphere of 150°-200° C. to form a graphite layer. These dipping and subsequent drying procedures are carried out a plurality of times in order to reduce the contact resistance between the abovedescribed semiconductor oxide layer 4 and the first conductor layer 5a to be described subsequently.

The anode body 1 is then dipped in a solution of conductive paste, which is composed primarily of graphite powder, an epoxy resin, an inorganic filler and the like in an organic solvent such as butyl cellosolve, and then dried in an atmosphere of 150°-200° C. in order to form the first conductor layer 5a (about 20–50 $\mu$m). After the anode body 1 is again dipped into a solution of conductive paste, which is composed primarily of graphite powder, an acrylic resin and the like in water, the anode body 1 is dried in an atmosphere of 150°-200° C. whereby the second conductor layer 5b is formed (thickness: about 30–60 $\mu$m).

After polybutadiene resin is coated onto the anode-lead-implanted surface by a dispenser, the anode body 1 is dried in an atmosphere of 150°-200° C. in order to form the covering resin layer 6.

The anode body 1 is then dipped into a solution of conductive paste in an organic solvent such as butyl cellosolve. The conductive paste is formed of 10–20% graphite powder, 30–60% copper powder, 15–30% epoxy resin and 2–6% inorganic filler. The anode body 1 is next heat-treated at 150°-200° C., whereby the conductive paste is thermally cured to form the third conductor layer 5c (thickness: 20–50 $\mu$m). Incidentally, the copper powder in the conductor layer 5c has a particle size of about 0.5 $\mu$m and serves as a catalyst upon plating. In addition, the inorganic filler provides the surface with roughness, thereby effectively enhancing the adhesion of the below-described first plating layer 7 owing to the anchoring effect of the rough surface. An unduly low content of copper powder in the third conductor layer 5c cannot provide the catalytic effect upon plating, while an excessively high content of copper powder results in a conductor layer of reduced strength and also leads to the problem that oxidation of copper takes place in a wet atmosphere, thereby increasing resistance. The conductive paste actually employed was composed of graphite powder, copper powder, epoxy resin and inorganic filler in proportions of 19%, 53%, 23% and 5%, respectively.

The anode body 1 is next dipped for 1–2 minutes in a 3.5% solution of hydrochloric acid, washed with purified water, and then subjected to electroless plating. During the plating, the semiconductor oxide layer 4, which is formed of manganese dioxide, and the dielectric oxide film layer are protected from gas produced during the plating reaction because the outer peripheral surface of the anode body 1 is covered with the first to third conductive layers 5a,5b,5c and the covering resin layer 6.

Using a plating solution composed of, for example, an electroless nickel plating solution (pH 6–7) containing dimethylamioboran as a reducing agent, plating is conducted at 60°-65° C. for 30–40 minutes. As a result, nickel plating is deposited to about 5 $\mu$m to form the first plating layer 7. After the completion of the plating, the anode body 1 is washed thoroughly with water and then dried in an atmosphere of 120°-150° C.

The fuse 15 with a small amount of a plating paste coated thereon is then soldered to the first plating layer 7, whereby the fuse 15 is connected to the first plating layer 7. A lead-silver alloy wire 0.15 mm in diameter is used as the fuse. A powdered epoxy resin is next electrostatically coated onto the outer peripheral surface of the device so formed, followed by heating and curing for about 30–90 minutes in an atmosphere of 100°-200° C. in order to form the insulating resin layer 8. By the application of the insulating resin layer 8, the fixed points of the fuse 15 have been reinforced.

Alumina powder having an average particle size of about 40–50 $\mu$m is next blown against the surface of the anode lead 2 and also against the surface of the insulating resin layer 8 at areas corresponding to the anode-lead-implanted surface and parts of side walls of the device in order to roughen these surfaces. A sponge impregnated with a solution of palladium amine compound in butyl acetate is brought into contact with the thus-roughened surfaces to coat the roughened surface with the solution. The device is then heat-treated in an atmosphere of 180°-200° C. in order to thermally decompose the palladium amine compound. The resulting palladium powder is allowed to remain. The purpose of roughening the surface is to increase the strength of adhesion of the below-described third plating layer 11. Further, the palladium powder has a particle size of about 0.01 $\mu$m and is deposited at a rate of about 0.3 $\mu$g/cm$^2$ (about $4\times10^{10}$ particles per cm$^2$).

A conductive paste of the same type as that employed for the formation of the first plating layer is next coated onto the insulating resin layer 8 at an area corresponding to the surface opposite to the anode-lead-implanted surface. After a sheet is pressed against the area to remove any excess paste, the device is heat treated in an atmosphere of 150°-200° C. to cure the paste into the fourth conductor layer 9 (thickness: about 20-100 μm).

The device is next dipped into the above-described electroless nickel plating solution to the depth of the anode lead 2 and subjected to plating at 60°-65° C. for 30-40 minutes. As a result, the second plating layer 10 is formed on the fourth conductor layer 9 while the third plating layer 11 is formed on the anode lead 2 and the insulating resin layer is coated on the anode-lead-implanted surface and parts of the side walls of the device. It is to be noted that the anode lead 2 and the insulating resin layer have been roughened and have palladium powder deposited thereon. At this time, no nickel is deposited on the insulating resin layer other than the roughened and palladium-deposited insulating resin layer since copper or palladium capable of serving as a catalyst upon plating is not present at these points.

The opposite end of the fuse 15, which has been connected to the first plating layer 7, is then soldered to the second plating layer 10 with a solder paste. A powder-like epoxy resin is caused to adhere in the same manner as in the above-described electrostatic coating and is then heated and cured, whereby the fuse 15 is covered with the insulating resin layer 8b.

Further, the second and third plating layers 10,11 are plated with a solder, respectively, so that the solder layers 12,12 are formed to provide the cathode terminal 13 and the anode terminal 14.

Finally, any surplus portion of the anode lead 2 is cut off by a laser. The fuse-incorporated, chip-type solid electrolytic tantalum capacitor has now been completed.

In the above embodiment, a capacitor making use of tantalum as a valve metal was described. It should be borne in mind that another valve metal, for example, aluminum, niobium or titanium, can be used either singly or as an alloy.

In the above embodiment, polybutadiene resin was used as a material for the covering resin layer 6. Since the covering resin layer 6 is provided to protect the dielectric oxide film and the semiconductor oxide layer 4 from gas (predominantly hydrogen gas) produced during the plating reaction, the material for the covering resin layer 6 is not limited to polybutadiene resin. Other resins such as an epoxy resin, acrylic resin, polyester resin, polyvinyl chloride or polypropylene or a mixture thereof are also usable.

Figure 3:
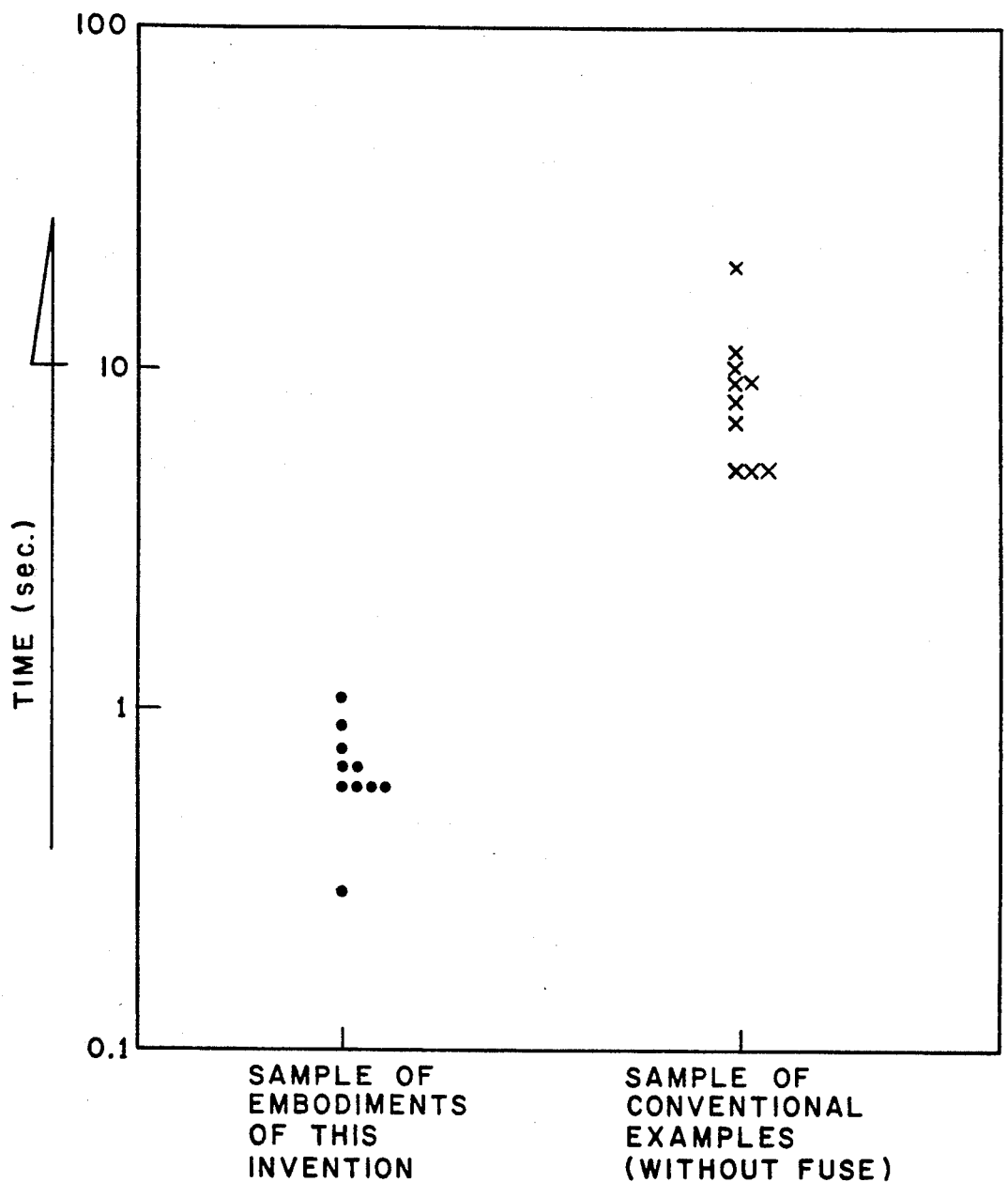
FIG. 3 is a diagrammatic representation of the relationship between the application time of an overload current and the behavior of samples of the embodiment of this invention and that of samples of conventional chip-type solid electrolytic capacitors when an overload current is applied to the samples.

FIG. 3 illustrates the action of the fuse and the incidence of burning over the passage of time when an overload current (5A in forward direction) was applied to samples of the fuse-incorporated, chip-type solid electrolytic capacitor of the present embodiment as well as to samples of conventional, chip-type solid electrolytic capacitors which do not incorporate a fuse.

Figure 2:
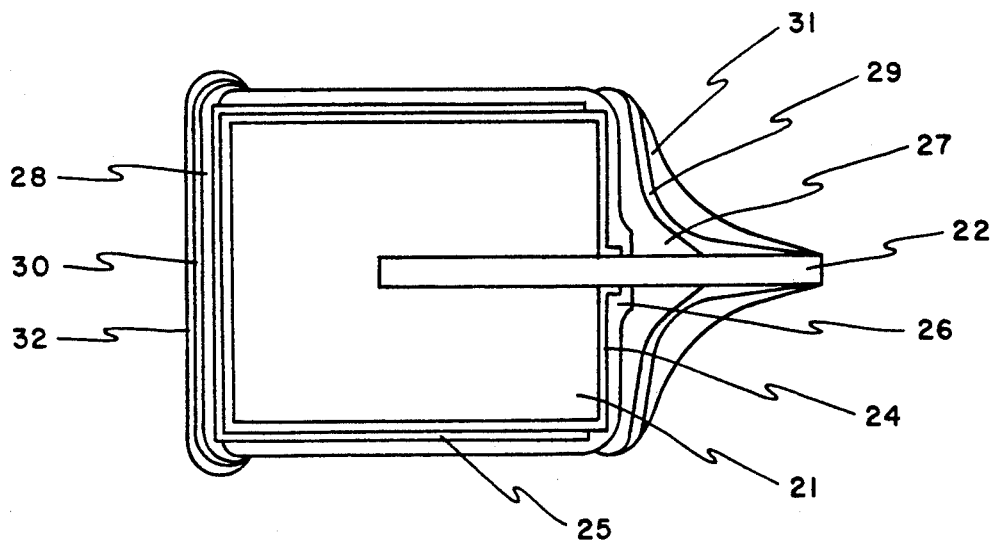
FIG. 2 is a cross-sectional view of a typical, conventional chip-type solid electrolytic capacitor.

The conventional capacitor has the construction depicted in FIG. 2. As a fabrication process thereof, a tantalum cathode body 21 similar to that employed in the above embodiment is used. First, it is subjected to anodic oxidation, followed by the formation of a cathode layer 25 composed of a manganese dioxide layer 24, a graphite layer and a silver paste layer. The insulating resin layer 26 is next formed in a similar manner to the above embodiment to expose the cathode layer 25 on the surface opposite the surface in which the anode lead 22 is implanted. Further, an anode conductor layer 27 made of a silver paste is formed on and around the anode-lead-implanted surface while a cathode conductor layer made of a silver paste was formed on and around the exposed cathode layer. Similarly to the embodiment described above, nickel plating is next applied to form plating layers 29,30. The device so fabricated is next dipped in a solder bath to form solder layers 31,32 on the plating layers 29,30, respectively, to complete the capacitor.

As is illustrated in FIG. 3, in most of the samples of the embodiment according to this invention, the fuse was caused to melt off so that burning was successfully avoided. In contrast, burning started after the passage of about 10 seconds in the samples of conventional capacitor without fuses.

Incidentally, the distribution in FIG. 3 can be primarily attributed to variations in internal resistance among the capacitors.

I claim:

1. A fuse-incorporated, chip-type solid electrolytic capacitor comprising:
    an element composed of an anode body and a dielectric oxide film, a semiconductor layer and a cathode layer sequentially formed on the anode body, said anode body being made of a valve metal and carrying an anode lead rising therefrom;
    an insulating resin layer applied on an outer peripheral surface of the element, said outer peripheral surface including an anode-lead-rising surface and another surface located on the side opposite to the anode-lead-rising surface;
    an anode terminal formed on the insulating resin layer applied on the anode-lead-rising surface;
    a cathode terminal formed on the insulating resin layer applied on the surface located on the side opposite to the anode-lead-rising surface: and
    a fuse electrically connecting the cathode layer and the cathode terminal.

2. The capacitor of claim 1, wherein at least one of the anode terminal and the cathode terminal comprises two layers, one being a plating layer and the other a solder layer.

3. The capacitor of claim 2, wherein the fuse is in an elongated shape; and the opposite end of the fuse is connected to a predetermined part of the cathode layer, extends through the insulating resin layer formed on the cathode layer and along the insulating resin layer, and is connected to the cathode terminal.

4. The capacitor of claim 3, wherein the valve metal is tantalum.

5. A process for the fabrication of a fuse-incorporated, chip-type solid electrolytic capacitor, which comprises the following consecutive steps:
    (a) forming a dielectric oxide film, a semiconductor oxide layer and a cathode layer sequentially on an anode body, said anode body being made of a valve metal and carrying an anode lead implanted therein;
    (b) connecting one end of an elongated fuse to a part of the cathode layer;
    (c) applying an insulating resin layer onto the entire outer peripheral surface of the element except for the anode lead and the connected fuse, said outer peripheral surface including an anode-lead-rising surface and another surface located on the side opposite to the anode-lead-rising surface;
    (d) forming an anode terminal on the insulating resin layer applied on the anode-lead-rising surface;
    (e) forming a cathode terminal on the insulating resin layer applied on the surface located on the side opposite to the anode-lead-rising surface; and
    (f) connecting the fuse the remaining end of which has been connected to the cathode layer to the cathode terminal electrically.

* * * * *